United States Patent [19]

Iwashita et al.

[11] Patent Number: 4,464,031
[45] Date of Patent: Aug. 7, 1984

[54] CONNECTION ARRANGEMENT FOR CAMERA SYSTEM COMPONENTS

[75] Inventors: Tomonori Iwashita, Tokyo; Yukio Mashimo, Kanagawa, both of Japan

[73] Assignee: Canon Kabushiki Kaisha, Tokyo, Japan

[21] Appl. No.: 391,965

[22] Filed: Jun. 24, 1982

[30] Foreign Application Priority Data

Jul. 1, 1981 [JP] Japan .................................. 56-102502
Jul. 1, 1981 [JP] Japan .................................. 56-102503

[51] Int. Cl.³ .......................... G03B 1/18; G03B 17/38
[52] U.S. Cl. .................................. 354/173.1; 354/268
[58] Field of Search ............... 354/127, 128, 145, 173, 354/266, 268, 126, 288, 295, 127.11, 127.12, 173.1, 173.11, 295.1

[56] References Cited

U.S. PATENT DOCUMENTS 4,086,603  4/1978  Kozuki et al. ................. 354/266 X

FOREIGN PATENT DOCUMENTS 2812599  9/1978  Fed. Rep. of Germany ...... 354/173

Primary Examiner—William B. Perkey
Attorney, Agent, or Firm—Toren, McGeady and Stanger

[57] ABSTRACT

In the disclosed camera system, a camera is attachable to a motor drive unit and a flash unit. In the camera, a detector produces a first signal before wind-up of the camera is completed. An interconnection terminal receives a second signal from the flash unit before charging of the flash unit is completed. A disabling arrangement prevents shutter release as long as it senses one of the first and second signals.

5 Claims, 4 Drawing Figures

CONNECTION ARRANGEMENT FOR CAMERA SYSTEM COMPONENTS

BACKGROUND OF THE INVENTION

1. Field of the Invention

This invention relates to camera systems and more particularly to camera systems composed of a camera, a motor drive unit for automatically winding the camera, and a strobe unit.

2. Description of the Prior Art

Camera stroboscopes, other than special stroboscopes, such as those using rectifier transformer arrangements with a commercial electrical power source and those using layer-built cells, conventionally require an electrical power source or a battery of small bulk and size. As a result, the charging cycle of a strobe unit, starting with emission of a flash and terminating with completion of recharging, takes a relatively long time. As the battery degrades, the required time becomes progressively longer. Therefore, using strobe units with systems taking a continuous succession of exposures, the photographer must wait for the recycle time of the strobe unit and make sure that the storage capacitor is fully charged after each exposure before releasing the shutter. This may annoy the photographer.

Another problem arises when the strobe unit is used with a camera operating with a motor drive unit for automatically winding the film. The motor drive unit winds the film one frame very quickly. If the recycle time of the strobe unit cannot follow at the same speed, photographs may be taken randomly illuminated with flash or ambient light. Thus, all efforts at a continuous succession of flash exposures may be in vain.

U.S. Pat. No. 4,086,603, issued Apr. 25, 1979 allows for a continuous succession of flash exposures using the combination of a camera with a motor drive unit and a strobe unit. This patent proposes a camera system which assures that actuation of each shutter release is made possible only after completion of the winding of the camera by the motor drive and recharging of the strobe unit. In this system, the signal representing the fact that the strobe unit has been fully charged is applied to the motor drive unit where a circuit actuates a shutter release. Therefore, when the system operates without the motor drive unit or when the camera is wound manually, it is no longer possible to assure that the shutter is released only after the camera is cocked and the strobe unit fully recharged. In other words, when the camera is switched into the manual winding mode, the system is no longer useful because a camera release is possible whether or not the strobe unit is fully charged.

Conventional camera systems having a strobe unit of the grip type attached through the motor drive unit to the camera generally use a code to connect a release button on the grip of the strobe unit and a remote control terminal of the motor drive unit so that a shutter release can be actuated by using the release button in the grip of the strobe unit. However, this gives rise to the following problem.

In such conventional camera systems, two codes are necessary, namely the X sync code which connects the camera and the strobe unit with each other, and a release control code which connects the strobe unit and the motor drive unit with each other. In motorized, rapid-sequence operation which requires the photographer to act quickly, the codes may interfere with his handling of the camera, and in extreme cases, the code is plugged out. Thus, there is a great possibility of the shutter being released without the strobe unit firing.

SUMMARY OF THE INVENTION

With the foregoing in mind, it is an object of the present invention to provide a camera system which assures that even with the camera in the manual winding mode, a shutter release is rendered actuable and the camera usable only when the camera is cocked and the strobe unit is fully recharged.

Another object of the invention is to provide a camera system with very simple means for rendering it possible to control the actuation of a motor drive unit and disable shutter release, and to provide a camera usable in such a camera system.

Still another object of the invention is to provide a camera system in which the attachment of a strobe unit to a motor drive unit suffices for establishing the transmission of a signal to a camera, and to provide a motor drive unit usable in said camera system.

A further object of the invention is to provide a camera system in which all that is needed to make it possible to transmit a signal from the strobe unit to the camera is to attach the strobe unit to the camera or the motor drive unit, regardless of whether a strobe unit is directly attached to the bottom panel of a camera or through a motor drive unit.

These and other objects of the invention will become apparent from the following detailed description of an embodiment thereof, when read in light of the accompanying drawings.

DETAILED DESCRIPTION OF THE PREFERRED EMBODIMENT

The present invention will next be described in greater detail in connection with an embodiment thereof by reference to the drawings.

Figure 1:
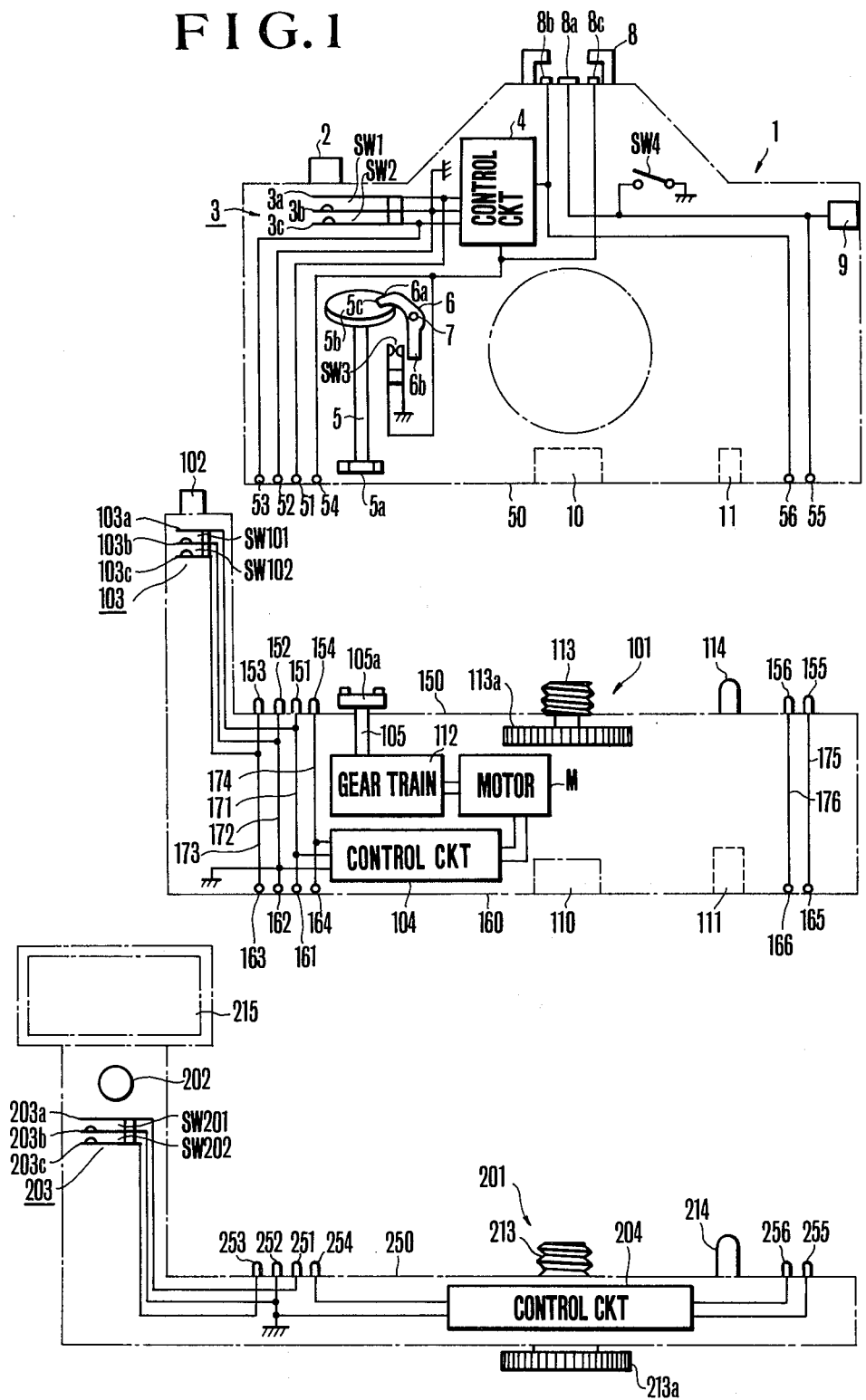
FIG. 1 is a schematic elevational view of a preferred embodiment of a camera, motor drive unit and strobe unit constituting a camera system.

FIGS. 1 to 4 illustrate a camera system having a camera employing one form of the invention including a motor drive unit and a strobe unit. FIG. 1, partly in block diagram form, illustrates an arrangement of electrical interconnections between a camera 1 and a motor drive unit 101 and between the motor drive unit and a strobe unit of the grip type.

In the camera 1, a release button 2 serves to operate a two-stage switch 3. The latter is composed of three contacts 3a, 3b and 3c. The contacts 3a and 3b form a light meter switch SW1, the contacts 3b and 3c form a release actuator switch SW2, and the contact 3b is grounded. All of the contacts 3a, 3b and 3c are electrically connected to a control circuit 4 and also to respective interconnection terminals 51, 52 and 53 on a bottom panel 50 of a housing of the camera 1 to which an accessory is to be attached. A winding shaft 5 is rotatably supported on a framework (not shown) of the camera 1, and is operatively connected through an intermediary, known in the art, to a film transport mechanism and a shutter charge or cocking mechanism (not shown). Fixedly secured to the bottom end of the winding shaft 5 is a drive connection or coupler 5a, and to its top end a cam disc 5b. The cam disc 5b is provided with a cutout 5c which, upon film (not shown) advancing one frame, engages a pawl 6a formed in one end portion of a winding stop lever 6 to hinder further winding. The winding stop lever 6 is rotatably mounted on a shaft 7 fixed to the framework of the camera 1. The opposite end 6b of the winding stop lever 6 is positioned adjacent a winding-up or wind-up switch SW3 so that when each cycle of a winding operation is completed and the pawl 6a enters the cutout 5c, the switch SW3 is turned off. When the exposure is completed, the stop lever 6 is turned clockwise by a closing curtain (not shown) of the shutter. The pawl 6a is then drawn from the cutout 5c and the winding or wind-up switch SW3 is turned ON. In other words, the wind-up switch SW3 assumes an OFF position from the end of a winding operation to the end of an exposure and an ON position from the end of an exposure to the end of the next winding operation. One contact of the winding switch SW3 is grounded and the other is connected to an interconnection terminal 54 and to the control circuit 4.

An X sync switch SW4 is connected to a terminal 55 and to a first contact 8a in a hot sync shoe 8 and a flash sync contact 9. A second contact 8b is connected to the control circuit 4 so that when an autoflash unit is fitted in the hot sync shoe 8, a signal for specifying the aperture of the lens is transmitted from the flash unit. At the same time, the second contact 8b is also connected to a terminal 56. An additional or third contact 8c receives a signal representing the voltage on a storage capacitor in the flash unit fitted on the hot sync shoe 8. The third contact 8c is connected to a point between the control circuit 4 and the wind-up switch SW3.

The flash unit attachable to the camera 1 at the shoe 8 has a circuit similar in construction to that used in a strobe or flash unit indicated at 201 and described later. Therefore, no further explanation is given here. A female screw 10 for a tripod is fixed in the bottom or accessory coupling panel 50 of the camera. A position determining hole 11 is provided for attachment and adjusting the position of the motor drive unit 101 or the flash unit 201 on the panel 50. Terminals 51 to 54 in the accessory coupling panel 50 are used in common with the motor drive unit 101 and the flash device 201 and terminals 55 and 56 are necessary only for the flash unit 201.

In the motor drive unit 101, a release button 102 cooperates with a two-stage switch 103 composed of three contacts, of which the first two form a control switch for a light metering circuit and the last two form a release actuator switch SW102. Unit 104 is a control circuit. A driving coupler 105a on a drive shaft 105 is arranged to engage the driven coupler 5a in the camera 1. A gear train 112 transmits the motion of a motor M to the driving shaft 105. A set screw 113 screw-threads into the tripod bushing 10 in the camera 1 to fixedly secure the motor drive unit 101 on the camera 1. The set screw 113 is freely rotatable relative to the housing of the motor drive unit 101 and has a knob 113a. Member 114 is a position determining pin; 110 a tripod bushing; and 111 a position-determining hole.

On the upper panel 150, at which the motor drive unit 101 confronts the camera 1, interconnection terminals 151 to 156 are positioned to couple with respective terminals 51 to 56 of the camera 1 when the motor drive circuit 101 is attached to the camera. A bottom panel 160 at which the motor drive unit 101 confronts the flash unit 201, carries interconnection terminals 161 to 166 positioned in one-to-one relationship with, and follows the same arrangement as the terminals 151 to 156 for the camera 1. The terminals 151 to 156 of the camera 1 and the terminals 161 to 166 of the flash unit 201 are connected to each other through respective electrically conductive wires 171 to 176 in the interior of the unit 101. All of the contacts 103a, 103b and 103c of the two-stage switch 103 are connected to the respective terminals 151 to 153 of the camera, and the control circuit 104 is connected to the terminals 151, 152 and 154 for connection to the camera. The terminals 151 to 154 for connection to the camera are used in common with the motor drive unit 101 and the flash unit 201, and the terminals 155 and 156 are used exclusively with the flash unit 201.

In the flash unit 201, a release button 202 is positioned on the grip and cooperates with a two-stage switch 203 consisting of three contacts 203a, 203b and 203c, of which the first two, 203a and 203b, form a light meter control switch SW201, and the last two, 203b and 203c, form a release actuator switch SW202. All of the contacts 203a, 203b and 203c are connected to respective interconnection terminals 251 to 253 provided on the upper panel 250 at which the flash unit 205 confronts the motor drive unit 101 or the camera 1. The terminal 252 and interconnection terminals 254, 255 and 256 are connected to the control circuit 204, and the terminal 252 is connected to ground. A set screw 213 has a knob 213a and is rotatably fitted into a flash unit housing upon screw-threading into the tripod bushing 10 or 110 to fixedly secure the flash unit 201 to the camera 1 or the motor drive unit 101. 214 is a position determining pin; and 215 a light emitting window.

Figure 2:
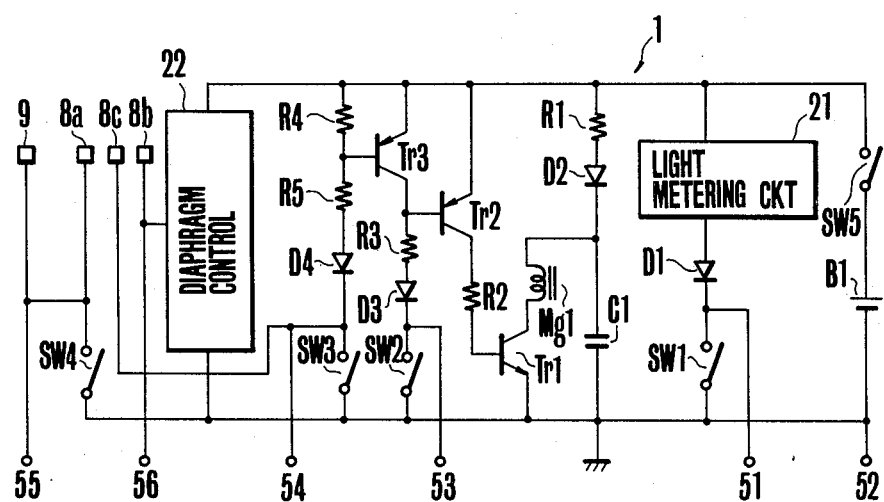
FIG. 2 is an electrical circuit diagram of the camera of FIG. 1.
Figure 3:
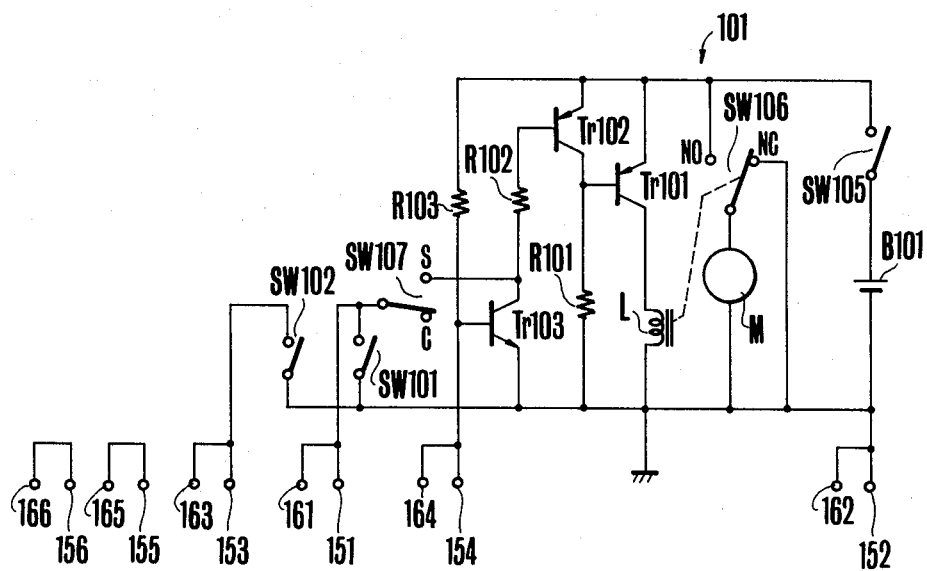
FIG. 3 is an electrical circuit diagram of the motor drive unit of FIG. 1.
Figure 4:
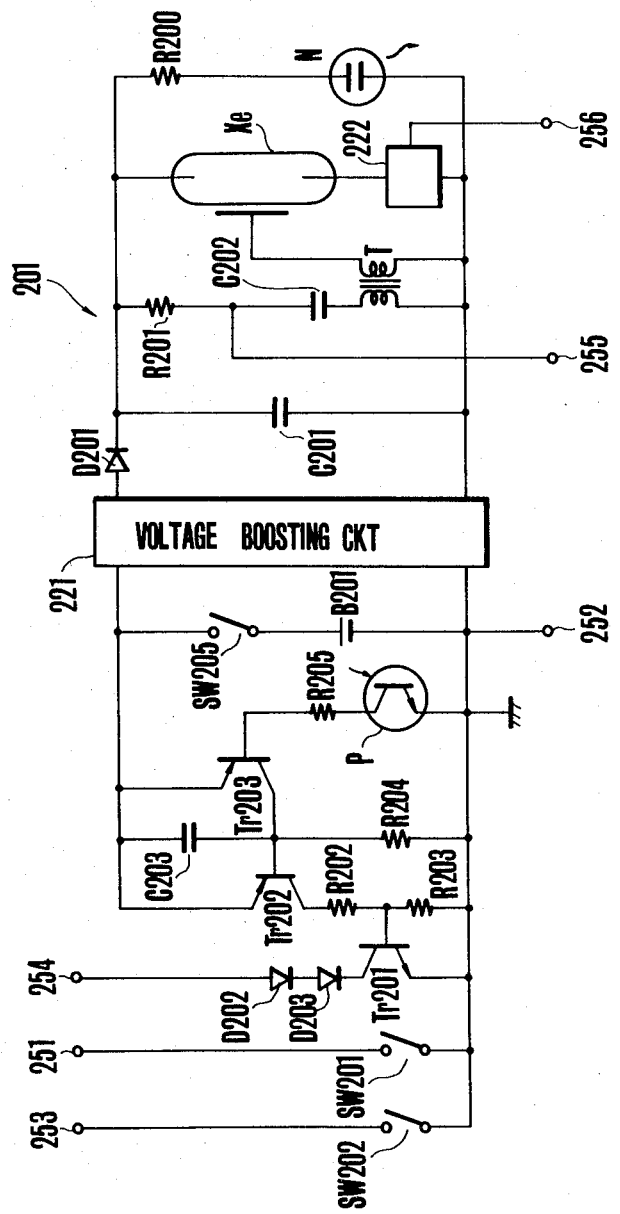
FIG. 4 is an electrical circuit diagram of the strobe unit of FIG. 1.

FIGS. 2 to 4 illustrate examples of the circuits of the camera 1, motor drive unit 101 and flash unit 201, respectively.

In FIG. 2, the same reference numerals have been employed to denote similar parts to those shown in FIG. 1 and their explanation is omitted. Here, an electrical power source or battery B1 of the camera is connected to a power switch SW5. The negative terminal of the battery B1 is connected to the terminal 52 and to ground as described above. A light metering circuit 21, known to those skilled in the art, is connected through a diode D1 to the control switch SW1. A lead wire from a connection between the diode D1 and switch SW1 is directed to the terminal 51. A capacitor C1 for driving a release control electromagnet Mg1 is connected in series to a string composed of a resistor R1 and a diode D2. To control the current supply to the aforesaid solenoid Mg1, a transistor Tr1 has its collector-emitter path connected in series with the solenoid Mg1, and its base connected through a resistor R2 to a collector of a transistor Tr2. A transistor Tr3 constitutes part of a release prohibiting means, and its collector is connected to the base of the transistor Tr2. A connection between the base of the transistor Tr2 and the collector of the transistor Tr3 is grounded through a resistor Tr3, a diode D3 and the aforesaid release switch SW2. A lead wire from a point between the diode D3 and the release switch SW2 is directed to the terminal 53. The base of the transistor Tr3 is routed through a resistor R4 to the power switch SW5 and through a resistor R5, diode D4 and the wind-up switch SW3 to ground. A lead wire from a point between the diode D4 and the wind-up switch SW3 is directed to the terminal 54. A diaphragm control circuit, responsive to the output of the flash unit appearing at the terminal 56 or second contact 8b, sets a specified aperture on the diaphragm in the lens mount.

In FIG. 3, the same reference numerals have been employed to denote parts similar to those shown in FIG. 1 and their explanation is omitted. Here, the motor drive unit 101 includes a battery B101 and a power switch SW105. The negative terminal of the battery B101 is connected to the terminals 152 and 162 and also to ground as described above. A relay coil L is controlled by a transistor Tr101 connected in series therewith. When energized, it moves a switch SW106 from an NC to a NO position. The switch SW106 is connected in series with the winding of the motor M. When switched to the NO position, the motor M is supplied with current. When to NC, the ends of the winding of the motor M are short-circuited to form a braking circuit so that rotation of the motor M is rapidly stopped. A transistor Tr102 forms a winding prohibition arrangement, its collector being connected to the base of the transistor Tr101, and through a resistor R101 to ground. The base of the transistor Tr102 is grounded through a resistor R102 and a transistor Tr103. The base of the transistor Tr103 is connected through a resistor R103 to the power switch SW105, and directly to the aforesaid terminals 154 and 164. A switch SW107 as a mode selector for the rapid-sequence and single frame exposure modes has a position C for rapid-sequence shooting and a position S for single frame shooting. The contact S of the selector switch SW107 is connected to the collector of the transistor TR103, and its common or movable contact is connected through the light meter control switch SW101 to ground and also directly to the terminals 151 and 161.

In FIG. 4, the same reference numerals have been employed to denote parts similar to those shown in FIG. 1. An electrical power source or battery B201 of the flash unit 201 is connected to a power switch SW205 of the flash unit 205. The negative terminal of the battery B201 is connected to the terminal 252 and also to ground as described. A voltage boosting circuit 221, a main capacitor C201, a trigger capacitor C202, a trigger coil T, and a diode D201 are connected to each other as illustrated. A point between a resistor R201 and the trigger capacitor C202 is connected to the terminal 255. A flash lamp or discharge tube Xe is connected in series with a firing control circuit 222. The firing control circuit 222 has a photo-sensitive element responsive to the amount of light emitted from the discharge tube Xe reaching a predetermined level for automatically stopping its firing, and produces a signal representing the preset value of the aperture on the flash unit which is then transmitted through the terminal 256 to the camera 1. A neon tube is connected in series with a resistor R200 so that when a predetermined amount of electrical charge is stored on the main capacitor C201, the neon tube lights. The terminal 254 is grounded through diodes D202 and D203 and a transistor Tr201. The base of the transistor Tr201 is connected through a resistor R202 and a transistor Tr202 to the power switch SW205 and through a resistor R203 to ground. Connected between the base of the transistor Tr202 and the power switch SW205 is a parallel circuit composed of a capacitor C203 and a transistor Tr203. The latter circuit is also connected through a resistor R204 to ground. The base of the transistor Tr203 is grounded through a resistor R205 and a photo-transistor P. This photo-transistor P is rendered conductive when the neon tube N is lit.

The operation of such a camera system is as follows: At first, it is assumed that the camera operates alone, without the use of the motor drive unit 101 and the flash unit 201. In FIGS. 1 and 2, assuming that the camera is cocked(as illustrated in FIG. 1),the pawl 6a of the winding stop lever 6 is in engagement with the cutout 5c of the cam disc 5b, and, therefore, the wind-up.switch SW3 is OFF. The photographer first turns on the power switch SW5. When the release button 2 is pushed down and reaches its first step or position, it causes the contacts 3a and 3b of the switch SW1 to contact each other and turn on the light meter control switch SW1. The light metering circuit of FIG. 2 is then rendered operative, and a light value is displayed. Further depression of the release button 2 to its second position or step causes the contacts 3b and 3c to contact each other and turn on the release switch SW2. Current then flows through the base of the transistor Tr2, the resistor R3, diode D3 and release switch SW2 to ground so as to make the transistor Tr2 conductive. At this time, the wind-up switch SW3, which is OFF, blocks the base current of the transistor Tr3 so that the transistor Tr3 remains non-conductive. Conduction of the transistor Tr2 causes conduction of the transistor Tr1 which in turn causes the charge on the capacitor C1 suddenly to flow to the release control solenoid Mg1, thus releasing the shutter to initiate an exposure.

At the termination of the exposure time, the closing curtain of the shutter runs down to its end at which the winding stop lever 6 is turned clockwise to draw the pawl 6a from the cutout 5c of the cam disc 5b, and turn on the wind-up switch SW3. Such closure of the wind-up switch SW3 causes the base current of the transistor Tr3 to flow through the resistor R5, diode 4 and wind-up switch SW3 to ground. This in turn causes conduction of the transistor Tr3 which short-circuits the emitter and base of the transistor Tr2 and renders it non-conducting. The transistor Tr1 is now also rendered non-conductive because its base current is blocked. This deenergizes the release control solenoid Mg1.

The photographer now cocks a film winding lever (not shown) to rotate the drive shaft 5 one revolution and advance a film one frame and reset the shutter. When the winding is completed, the cutout 5c of the cam disc 5b appears opposite the winding stop lever pawl 6a. At this time, the closing curtain of the shutter is already reset, so the winding stop lever 6 is rotatable in the counterclockwise direction. The winding stop lever 6 now turns counterclockwise in response to a spring (not shown) and the pawl 6a enters the cutout 5c of the cam disc 5b. The winding switch SW3 is simultaneously turned off. Thus, the position illustrated in FIG. 1 is regained.

Since the wind-up switch SW3 is closed from the time of termination of the exposure to the completion of the following winding operation, certainty exists that even when the release button 2 is accidentally pushed down to close the release actuator switch SW2, the release control solenoid Mg1 is not energized, that is to say, actuation of a shutter release.

A flash exposure may, for example, be made by using a flash unit either on the hot sync shoe 8 or with its cord connected to the sync contact 9. In those cases, as a shutter release is actuated, and the opening curtain of the shutter completely runs down, the X contact or SW4 is turned on. This is signalled through the first contact 8a, or sync contact 9 to fire the flash lamp. If this flash unit is of the type that produces a signal representing a specified aperture for auto-exposure flash and another signal representing the fact that the flash unit has not recycled yet, these signals are transmitted through the second and third contacts 8b and 8c to the diaphragm control circuit 22 and the shutter release prohibiting circuit (Tr3, R4, R5, D4) in the camera 1. Thus, the specified aperture is automatically set on the diaphragm in the photographic objective, and depression of the release button 2 is rendered ineffective for actuating a shutter release. The following refers to the motorized shooting modes. To securely fit the motor drive unit 101 to the camera 1, the position determining pin 114 is made to slide into the hole 11 and the set screw 113 is threaded into the tripod bushing 10 by turning the knob 113. This couples the interconnection terminals 151 to 156 upwardly projecting out of the upper panel 150 of the motor drive unit 101 with respective sockets 51 to 56 in the bottom panel 50 of the camera housing 1. Therefore, the light meter control switch SW101 in the motor drive unit 101 is connected in parallel with the equivalent switch SW1 in the camera 1 through the terminal 151 and terminal 51, and terminal 152 and terminal 52 connections. Also, the release switch SW102 in the motor drive unit 101 is connected in parallel with the equivalent switch SW2 in the camera through the connection of terminal 152 and terminal 52, and the connection of terminal 153 and terminal 53. As a result, the photographer has a choice of using the release button 2 on the camera 1 or the release button 102 on the motor drive unit 101 for the same operation.

For ease of explanation, the release button 102 of the motor drive unit 101 is presumed to be chosen. It is also assumed that the camera 1 is wound up (as illustrated in FIG. 1), and the motor drive unit 101 is set to the C position by the switch SW107 for continuous successive exposures. The photographer first turns on the power switch SW5 of the camera 1 and the power switch SW105 of the motor drive unit 101. Now, because the wind-up switch SW3 and selector switch SW107 are OFF, the transistor Tr103 conducts. Therefore, the transistor TR102 conducts and the transistor Tr101, because its emitter-base path is short-circuited, is non-conductive. Hence, the relay coil L remains unenergized. Therefore, the switch SW106 assumes the position NC where the ends of winding of the motor M are short-circuited, and the motor M is inoperative.

When the release button 102 of the motor drive unit 101 is pushed down to its first position or step, the light meter control switch SW101 is turned on. This causes the light metering circuit 21 to derive a light value which is displayed in the finder. Further depression of the release button 102 to its second step, turns on the release switch SW102 which makes the transistor Tr2 conduct. As stated, therefore, the camera 1 now operates to release the shutter, and initiate an exposure. After the exposure, when the closing curtain runs down completely, the wind-up switch SW3 is turned on, and the base of transistor Tr103 is connected to ground through the connection of terminal 54 and terminal 154. This renders the transistor Tr103 nonconductive, which, in turn, turns off the transistor Tr102. (Since the selector switch SW107 is in position C, switching the transistor Tr103 OFF results in cutting off the base current of the transistor Tr102.) The transistor Tr101 is then turned on to energize the relay coil L which shifts the switch SW106 to position NO where the motor M is energized. This initiates a film winding operation.

At the termination of the winding operation, as stated, the wind-up switch SW3 is turned off, causing both of the transistors Tr102 and Tr103 to turn on, which, in turn, short-circuits the emitter-base path of the transistor Tr101 and turns it off. Therefore, the relay coil L is de-energized again, and, the switch SW106 is moved from position NO to NC. There, the ends of the motor winding are short-circuited and the motor M rapidly stops by virtue of the resulting braking action.

At this time, if the release button 102 is still pushed down, the wind-up switch SW3 is turned off, so that the transistor Tr3 is turned off, and the short-circuit across the emitter-base path of the transistor Tr2 is discontinued. Hence, base current in the transistor Tr2 flows through the resistor R3, diode D3, terminals 53 and 153 and release switch SW102 to ground. Since the transistors Tr1 and Tr2 are conductive, termination of the film winding operation is followed without delay by re-energization of the release control solenoid Mg1 for actuation of the next shutter release. This results in motorized rapid-sequence photography.

The motor drive unit 101 is switched to the single frame shooting mode by the selector switch SW107 being moved to position S. In that case, despite the wind-up switch SW3 being turned on after termination of the exposure operation, continuing to depress the release button 102 to maintain the light meter control switch SW101 ON allows the base current of the transistor Tr102 to flow through the resistor R102, selector switch SW107 and light meter control switch SW101 to ground. This permits the transistor Tr102 to continue conducting. Therefore, when the photographer removes his finger from the release button 102, and the light meter switch SW101 is turned off, the transistor Tr102 turns OFF. The transistor Tr101 now conducts to energize the relay coil L. Thus, the motor drive unit starts to move for advancement of the film by one frame.

Shooting of the camera 1 while using the flash unit 201 (after the removal of the motor drive unit 101) occurs as follows. First, the flash unit 201 is securely attached to the camera by turning the set screw knob 213a while the position determining pin 214 is inserted into the hole 11, until the set screw 213 is fully threaded into the bushing 10. The interconnection terminals 251 to 256 projecting upwardly of the upper panel of the housing of the flash unit 201 are arranged just to oppose the respective interconnection terminals or sockets 51 to 56 in the bottom or accessory coupling panel 50 of the camera housing 1. This attaching operation automatically serves to establish the electrical connections between the terminals 53 and 253, 52 and 252, 51 and 251, 54 and 254, 56 and 256, and 55 and 255. Thereupon, the light meter control switch SW201 in the flash unit 201 is connected in parallel with the equivalent switch SW1 in the camera 1 through the connection of terminal 51 and 251 and the connection of terminal 52 and 252. The release switch SW202 in the flash unit 201 is connected in parallel with the equivalent switch SW2 in the camera 1 through the connection between terminal 52 and terminal 252 and the connection between terminal 53 and terminal 253. Therefore, the photographer has a choice of using the release button 2 on the camera 1 or the release button 202 on the flash unit 201 for the same operation.

For ease of explanation, the release button of the flash unit 201 is chosen. We assume that the camera 1 is wound up (as illustrated in FIG. 1), and the shutter speed is set for synchronism (for example, 1/60 sec.). The photographer first turns on the power switches SW5 and SW205. Hence, because the main capacitor C201 of FIG. 4 is discharged, i.e., not yet fully charged), the neon tube N is not lighted yet. Therefore, the photo-transistor P is OFF, and the transistor Tr203 is also OFF, while the transistors Tr202 and Tr201 are ON. This, despite the opening of the wind-up switch SW3, (see FIGS. 2 and 4,) renders the transistor Tr3 conductive as its base current flows through the resistor R5, diode D4, terminals 54 and 254, diodes 202 and 203 and transistor Tr201 to ground. Thus, the transistor Tr2 is prevented from conducting. In this state, even when the release button 202 is pushed down to turn on the release switch SW2, the transistor Tr2 does not turn on, and, therefore, the release control solenoid Mg1 is maintained unenergized. Thus, the depression of the release button 202 has no effect on actuation of a shutter release. That is, it is in this state that a shutter release is prevented.

From the time of the closing of the power switch SW2 of the flash unit 201, the voltage of the battery B201, after being increased by boosting circuit 221, starts to charge the main capacitor C201. When the voltage across the main capacitor C201 reaches a predetermined level, the neon tube N is lit. This turns on the photo-transistor P which then turns on the transistor Tr203. This short-circuits the base emitter path of the transistor Tr202 which now turns off. Consequently, the transistor Tr3 in the camera 1 is now cut off and the latter transistor is turned off. Thus, the camera becomes actuable for release.

The firing control circuit 222 in the flash unit produces an output signal representing the one of the proper apertures which has been preset on the flash unit 201. This signal is transmitted through the terminals 256 and 56 to the diaphragm control circuit 22 in the camera 1. This adjusts the size of the aperture opening to the preset size through intermediate means known to those skilled in the art. Then, when the release button 202 of the flash unit 201 is pushed down to its first position or step, it turns on the light meter control switch SW201 and a light value is derived and displayed as described above. Upon further depression of the release button to its second step, the release switch SW202 is turned on and the transistor Tr2 is thus made conductive. This is followed by actuation of a shutter release as stated. When the opening curtain of the shutter runs down to its fully open position, the X contact or switch SW4 is closed so that the positive pole of the trigger capacitor C202 is connected to ground through the terminals 55 and 255. This results in the transformer T firing the flash discharge tube Xe. When the amount of light emitted by the flash reaches a predetermined level, the firing control circuit 222 stops discharging the main capacitor C201 through the tube Xe. As the charge stored on the main capacitor C201 discharges, its potential is lowered, and the neon tube N is turned off. Then, the transistor Tr203 is also turned off. Thereupon, charging of the capacitor C203 starts. After a prescribed time interval depending upon the capacitor C203 and resistor R204, the transistor Tr202 turns on which, in turn, switches on the transistor Tr201 which causes the transistor Tr3 of the camera 1 to turn on again. Preferably, this time interval is longer than that beginning with the closure of the X contact or SW4 and terminates with completion of the exposure at the synchronizable shutter speed of 1/60 sec. or thereabouts. Upon termination of the exposure operation at the synchronized shutter speed, the closing curtain of the shutter runs down to a totally closed aperture position where, as stated, the wind-up switch SW3 is closed. Then, the camera 1 is cocked by the rapid wind lever (not shown) to prepare the next flash exposure provided that the flash unit 201 has also recycled.

Motorized flash photography involves the camera 1 using the motor drive unit 101 in combination with the flash unit attached to the bottom panel 160 of the motor drive unit 101. The camera 1 is first coupled with the motor drive unit 101. After that, the camera 1 is coupled to the flash unit 201. For this, the operator, while inserting the position-determining pin 214 on the flash unit into the hole 111 in the bottom panel 160 of the motor drive unit 101, must turn the set screw knob 213a until the set screw 213 is fully threaded into the tripod bushing 110. This securely fits the flash unit 201 to the motor drive unit 101.

The interconnection terminals 251 to 256 projecting upwardly from the upper panel 250 of the flash unit 201 are now arranged just opposite the respective interconnection terminal or sockets 161 to 166 in the bottom panel of the motor drive unit 101. Hence, the electrical connections between the terminals 163 and 253, 162 and 252, 161 and 251, 164 and 254, 166 and 256, and 165 and 255 are automatically established. Therefore, the light meter control switch SW201 in the flash unit 201 is connected in parallel to either of the equivalent switches SW101 and SW1 in the motor drive unit 101 and camera 1 through the connections of the respective terminals 161 and 251, 51 and 151, 162 and 252, and 52 and 152. The release switch SW202 in the flash unit 201 is connected in parallel to either of the equivalent switches SW102 and SW2 in the motor drive unit and the camera 1 through the connections of the respective terminals 162 and 252, 52 and 152, 163 and 253, and 53 and 153. Therefore, either the release button 2 of the camera 1, or the release button 102 of the motor drive unit 101, or the release button 202 of the flash unit 201, can all perform the same function. Here, for ease of explanation, only the release button 202 of the flash unit 201 is assumed to be used.

It is now assumed that the camera 1 is wound up (as illustrated in FIG. 1, the shutter speed is set at a synchronizable time, for example, 1/60 sec., and the mode selector switch SW107 of the motor drive unit 101 is set at C for rapid-sequence photography. The operator first turns on all of the power switches SW5, SW105 and SW205 in the camera 1, motor drive unit 101 and flash unit 201, respectively. Thereupon, the transistor Tr201 in the flash unit 201 is rendered and maintained conductive until the main capacitor C201 is charged to the predetermined high voltage. Until the latter voltage is reached, the unit 201 gives off an electrical signal which is applied through the successive connections of the terminals 254, 164, 154, and 54 to turn on the transistor Tr3 in the camera 1 to prevent actuation of a shutter release. At this time, the potential at the terminal 164 is maintained at a prescribed level (about 1.4 volts) due to the voltage drop of the diodes D202 and D203. Hence, the transistor Tr103 whose base is connected to the terminal 164 does not turn off. In this condition, the motor M will not start.

When the voltage across the main capacitor C201 in the flash unit 201 reaches the predetermined level, the transistor Tr202 is turned off. This turns off the transistor Tr201 and makes actuation of a shutter release possible. Pushing the release button 202 of the flash unit 201 down to its first step, then closes the light meter control switch SW201 and causes derivation and display of a light value. Further depression of the release button 202 to its second position turns on the release switch SW202 so that the camera 1 releases the shutter. The flash unit is then fired.

After termination of the exposure operation, when the wind-up switch SW3 is closed, the motor drive unit 101 is supplied with an actuating signal for the motor M. On the other hand, the flash unit 201 responds to the re-opening of the X contact or SW4 and recharges the main capacitor C201 during a time interval at the termination of which the transistor Tr201 is turned on to ready actuation of the next shutter release. When the motorized winding operation of the camera 1 is completed, and the winding stop lever pawl 6a catches the cam disc 5b at its cutout 5c, the wind-up switch SW3 opens again to stop the motor M. At this time, if the voltage on the main capacitor C201 has already reached the predetermined level, the neon tube N is lit, and, as has been stated above, the transistor Tr201 is not conducting. Therefore, as long as the release button 202 is pushed down past the time the winding operation is terminated, the opening of the wind-up switch SW3 is immediately followed by turning off of the transistor Tr3. As has been stated above, the transistor Tr1 is then turned on to energize the release control solenoid Mg1 so that a second shutter release is actuated.

Alternately, when the winding operation is terminated, the wind-up switch SW3 may be opened, the main capacitor C201 in the flash unit 201 not yet fully recharged, the neon tube N unlit, and the photo-transistor P non-conducting. Therefore, the transistor Tr201 continues conducting so that the predetermined potential (about 1.4 volts) appears at the terminal 254, and current can flow therethrough. Therefore, the base current of the transistor Tr3 in the camera 1, flows through the resistor R5, diode D4, terminals 54, 154, 164 and 254, diodes D202 and D203 and transistor Tr201 to ground. Thus, the transistor Tr3 keeps conducting and disabling the shutter release. On the other hand, although the base of the transistor Tr103 in the motor drive unit 101 is then also connected to ground through the terminals 164 and 254, diodes D202 and D203 and transistor Tr201, it is on because of the presence of 1.4 volts from the terminal 164 (or terminal 254). Thus, it is at the time that the wind-up switch SW3 opens that the transistor Tr103 turns on, thereby cutting off the current supply to the motor M and short-circuiting the ends of the motor winding to brake and stop the motor M quickly.

It will be appreciated from the foregoing that when a continuous succession of flash exposures is taken with the motor drive unit 101 and flash unit 201 releasably attached to the camera 1, the invention assures a sequence which permits actuation of the next shutter release at the time that the preceding shutter cocking cycle and film winding operation are completed and the flash unit 201 has recycled.

In the embodiment illustrated, the transistor Tr3, resistors R4 and R5 and diode 4 constitute a release disabling means. The wind-up switch SW3 constitutes a detecting means with its ON and OFF positions corresponding to the first and second ones respectively. Also, the terminal 54 corresponds to both the outlet at which the output of the detecting means appears, and the inlet for arrival of the signal representing the fact that the flash unit is not yet recycled.

The illustrated embodiment makes it possible to assure postponement of the actuation of the shutter release until the flash unit has charged, regardless of whether the system is operated in the motorized or manual winding mode. Also, the invention reduces the number of interconnections or interconnect terminals on the camera because a single terminal 54 suffices for several purposes. The terminal 54 receives the de-actuating signal in the form of a voltage drop of about 1.4 volts produced across the diodes D202 and D203 when the transistor 201 turns on. On the other hand, the same terminal 54 also transmits the low (zero) output signal from the wind-up switch SW3 as an actuation command signal to the motor drive unit 101, and the high output from the wind-up switch SW3 (due to ungrounding) as a stop command signal to the motor drive unit 101. The deactuating signal from the flash unit 201 and the actuating command signal to the motor drive unit are composed of potentials of 1.4 volts and 0 volts respectively, a voltage difference which helps prevent faulty operation of the motor drive unit 101 due to the deactuating signal.

The illustrated embodiment not only makes it possible to couple the camera 1 directly to either the motor drive unit 101 or the flash unit 201 without use of a cord, but also makes it possible to eliminate the use of cords entirely when overall communication is established by attaching the motor drive unit 101 to the camera 1 and by attaching the flash unit 201 to the bottom of the motor drive unit 101. This arrangement improves manageability of the entire system.

In the illustrated embodiment, the connection necessary for receiving the signal representing the fact that the charging recycle has not yet finished and the connection necessary for transmitting command signals to the motor drive unit 101 are combined at a single common terminal 54. However, it should be understood that the present invention is not limited to this structure. Separate terminals may also be used.

The present invention is also not limited to cameras of the type having separately attached flash units. It is applicable to cameras of the types having built-in flash devices.

According to an embodiment of the invention, the terminals 51 to 56 of the camera 1 and the terminals 161 to 166 on the panel of the motor drive unit which is coupled to the flash unit are rigidly constructed. On the other hand, the camera terminals 151 to 156 of the motor drive unit 101 and the terminals 251 to 256 of the flash unit are movably mounted. This assures establishment of secure contact between the terminals in each pair. The terminals may be embodied otherwise, such as in the form of the so-called plug-end type.

As described, the present invention furnishes a camera which disables a shutter release in response to either a first signal occurring from the end of the shutter operation to the end of a winding action, or a second signal which prevails when the flash unit has not yet been fully charged. This offers the advantage that systems using a flash unit, regardless of whether the film advance is motorized or manual, actuation of the shutter release is postponed pending simultaneous completion of the camera being wound and the flash unit being charged.

This assures correct exposures without causing an unduly large increase in the complexity of the camera system. The invention utilizes a single terminal which transmits the first signal to the motor drive unit and receives the second signal, makes it unnecessary to provide a second terminal which would otherwise be necessary for the second signal. This advantageously limits the number of terminals necessary for this type of camera to a minimum.

A further advantage arises from the fact that the arrangement of motor drive unit terminals facing the camera is the same as the number of terminals facing the flash unit and each of the pairs of corresponding terminals are connected to each other through the interior of the motor drive unit. Therefore, cords for the transmission of signals from the flash unit to the camera are unnecessary whether the flash unit couples to the camera directly or through the motor drive unit.

What we claim:

1. A camera to which a motor drive unit and a flash unit ar attachable, comprising:
    (a) detecting means for producing a first signal when winding of the camera is not yet completed;
    (b) a interconnection terminal for receiving a second signal from said flash unit when charging of said flash unit is not yet completed and for delivering the first signal to a motor drive unit when a motor drive unit is mounted on the camera; and
    (c) release prohibiting means for preventing a shutter release as long as at least one of said first and said second signal is applied thereto.

2. A camera according to claim 1, wherein said release prohibiting means has a release control electromagnet and a switching means responsive to at least one of said first and said second signals for hindering current supply to said release control electromagnet.

3. A motor drive device having a first face on which a camera can be mounted and a second face on which a flash unit can be mounted, comprising:
    a first positioning member on the first face for engaging a positioning member on the camera and positioning the motor drive relative to the camera;
    first securing means on the first face connectable to securing means on the camera to secure the motor drive to the camera by engagement of the first positioning member to the positioning member on the camera;
    a first connecting terminal on the first face connectable to a connecting terminal on the camera to transfer a signal from the camera when the first securing means and first positioning member position and secure the camera to the motor drive device;
    a second positioning member on the second face for engaging the flash unit and positioning the flash unit relative to the first face, second securing means on the second face for fixing the flash unit to the second face, and a second connecting terminal at the motor drive device for transferring the signal from the flash unit, the second positioning member, the second securing means, and the second connecting terminal being aligned respectively with the first positioning member, the first securing means, and the first connecting terminal, and arranged relative to each other along the same pattern so as to receive a camera and a flash unit whose positioning members, securing means, and connecting terminals are arranged to engage each other; and
    conductive means for producing a conductive state between the first connecting terminal and the second connecting terminal.

4. A motor drive unit according to claim 3, wherein said first connecting terminal is arranged to receive a first signal which is produced when the camera is not yet wound up, and said second interconnecting terminal is arranged to receive a signal which is produced when the flash unit is not yet fully charged.

5. A motor drive unit according to claim 4, further including:
    a motor for performing a wind up of said camera; and
    a switching means for supplying said motor with current during the time when said first signal is applied to said first interconnecting terminal, said switching means being set so as not to effect current supply when the second signal is applied to said second connecting terminal.

* * * * *